Jan. 26, 1932  B. BRONSON  1,842,504
RUNNING BOARD
Filed March 26, 1930
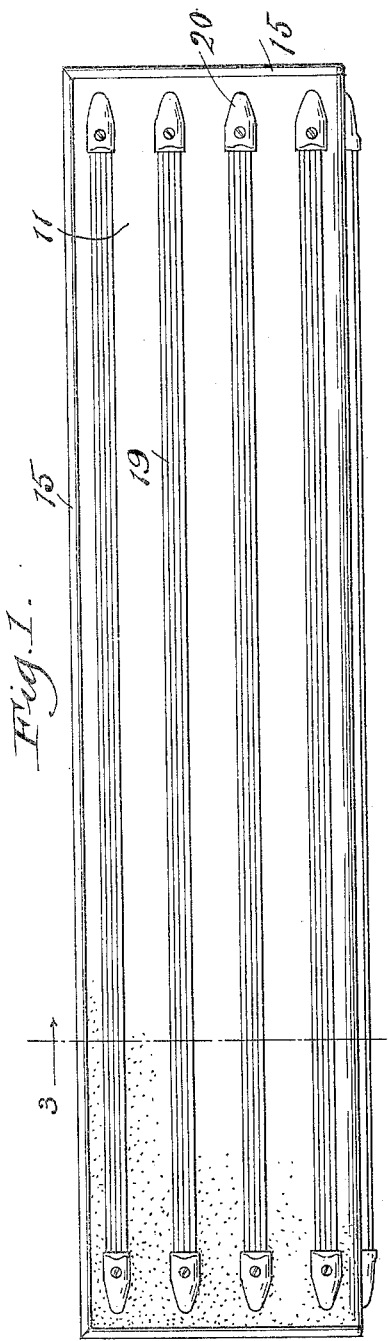
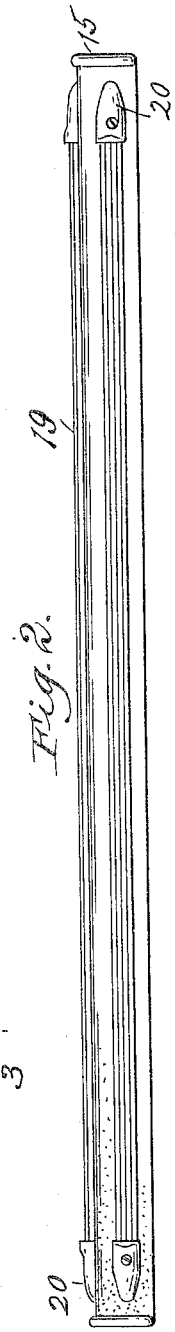
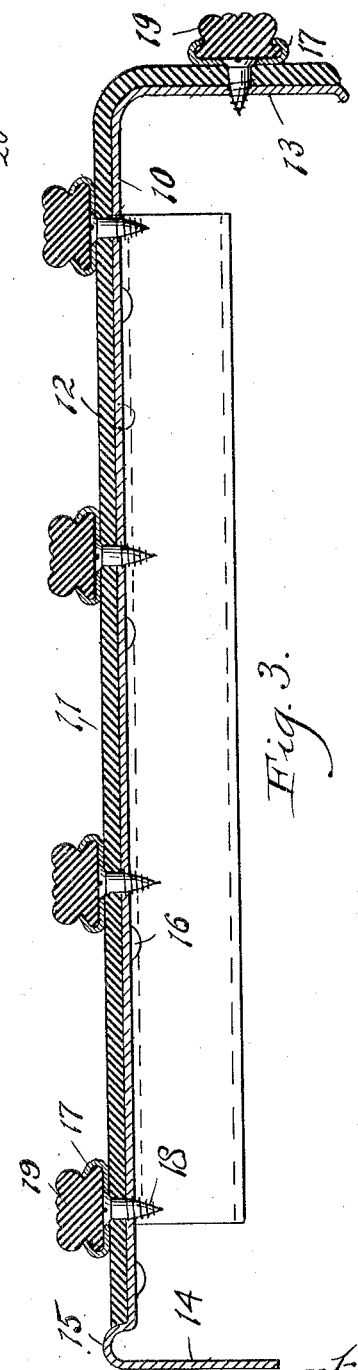
Inventor
Budd Bronson
Kwis Hudson & Kent
Attys.

Patented Jan. 26, 1932

1,842,504

UNITED STATES PATENT OFFICE

BUDD BRONSON, OF CLEVELAND, OHIO, ASSIGNOR TO THE OHIO RUBBER COMPANY, OF CLEVELAND, OHIO, A CORPORATION OF OHIO

RUNNING BOARD

Application filed March 26, 1930. Serial No. 438,956.

This invention relates to vehicle running boards and more particularly to an improved form of composite steel and rubber running board which is very attractive in appearance.

Other objects and advantages of this invention will be apparent from the following description taken in conjunction with the accompanying sheet of drawings, in which:

Fig. 1 is a top plan view of a running board embodying my invention;

Fig. 2 is a front elevational view of the running board shown in Fig. 1; and

Fig. 3 is a transverse sectional elevation taken on line 3—3 of Fig. 1.

In the drawings, to which I shall now refer in detail, I have shown a composite steel and rubber running board constructed according to my invention. It should be understood, however, that my invention may also be embodied in running boards of other shapes or forms.

The running board which I have illustrated is provided with a metal body 10 to which a rubber covering 11 has been attached by being molded and vulcanized in contact with the surface of the metal body. The metal body is formed of sheet metal and is substantially rectangular in shape, having a flat, horizontally extending top portion 12. Along the outer edge of the metal body or, in other words, along the edge which is away from the vehicle structure when the running board is assembled in place, some of the metal is turned or bent downwardly to provide the depending flange 13. Along the inner edge of the metal body or the edge which is toward the vehicle structure, some of the metal is bent downwardly to provide the longitudinally extending, depending flange 14. An integral rounded bead 15 projects above the surface of the top wall portion of the metal body and extends across the ends thereof and along the inner edge.

The rubber covering 11 is preferably in the form of a sheet of rubber which is vulcanized to the surface of the metal body and which may be provided with a suitable pattern or configuration. This rubber sheet covers the major portion of the top surface of the metal body and is extended downwardly upon the depending flange 13. To assist in securing the rubber covering to the metal, spaced rubber rivets 16 may be formed integral with the covering and extended through the metal body.

At spaced intervals upon the top surface and front flange of the running board, I provide longitudinally extending, channel-shaped metal members 17. These metal members are supported upon the rubber covering and terminate somewhat short of the ends of the metal body. They are secured in place by any suitable means, such as screws 18 of well known form, which extend through the bottom wall of these members and the rubber covering 11, and which engage the wall of the metal body. Rubber strips 19 are held in these channel-shaped members by being provided with base portions which correspond with the shape of these members and which engage therein. Metal clips 20 are secured to the metal body so as to cover the end portions of the rubber strips and of the channel-shaped metal members.

To give the running board an attractive appearance, the exposed portions of the channel-shaped members may be given a bright or decorative finish by treating these portions with or applying to these portions any suitable substance or material. Likewise, the metal clips 20 and the bead 15 extending across the ends and along the inner edge of the metal body may also be provided with a bright or decorative finish. In addition to their function as a means for securing the rubber strips in place and as a means for enhancing the appearance of the board, the channel-shaped members also serve as clamping means which assist in securing the rubber covering to the metal body.

It will now be readily seen that I have provided a very durable form of vehicle running board having a very attractive appearance, and while I have shown and described the running board of my invention in a detailed manner, it should be understood, however, that I do not intend to limit myself to the precise details shown and described but regard my invention as including such changes and modifications as do not involve a departure from the spirit of the invention and the scope of the appended claims.

Having thus described my invention, I claim:

1. A running board comprising a metallic body, rubber covering molded and vulcanized to said body, spaced substantially parallel metal members mounted on said rubber covering and secured to said body, and strips of rubber held by said metal members.

2. A running board comprising a metallic body having a depending flange along one edge thereof, rubber covering molded and vulcanized to said body so as to extend down upon said depending flange, spaced substantially parallel metal members secured to said body, and strips of rubber held by said metal members.

3. A running board comprising a metallic body, rubber covering molded and vulcanized to said body, channel-shaped metal members supported on said rubber covering in substantially parallel relation and secured to said body, and strips of rubber having a portion thereof shaped for engagement in said channel-shaped members.

4. A running board comprising a metallic body having a depending flange along one edge thereof, rubber covering molded and vulcanized to said body so as to extend down upon said depending flange, spaced channel-shaped metal members supported in substantially parallel relation on said rubber covering, and strips of rubber shaped for engagement in said channel-shaped members.

5. A running board comprising a metal body, substantially channel-shaped metal members secured to said body in spaced relation, rubber strips held in said channel-shaped members, and sheet-rubber covering vulcanized to said body intermediate the points of connection said channel-shaped members with said body.

6. A running board comprising a metal body, spaced metal members secured to said body, rubber strips held by said members, and sheet-rubber covering vulcanized to and covering said body intermediate the portions thereof to which said members are secured.

7. A running board comprising a metal body, rubber covering molded and vulcanized to said body, longitudinally extending metal members mounted upon said rubber covering and secured to said body, rubber strips held in said metal members, and metal clips covering the ends of said rubber strips and said metal members.

8. A running board comprising a metal body, substantially channel-shaped metal members arranged to extend longitudinally of said body and secured thereto in spaced relation, rubber strips held in said channel-shaped members, sheet-rubber covering vulcanized and attached to said body intermediate said channel-shaped members, and metal clips covering the ends of said rubber strips and said channel-shaped members.

9. A running board comprising a metallic body, non-metallic covering molded in contact with and intimately attached to said body, spaced substantially parallel metal members mounted on said non-metallic covering and secured to said body, and strips of non-metallic material held by said metal members.

In testimony whereof, I hereunto affix my signature.

BUDD BRONSON.